Figure 1:
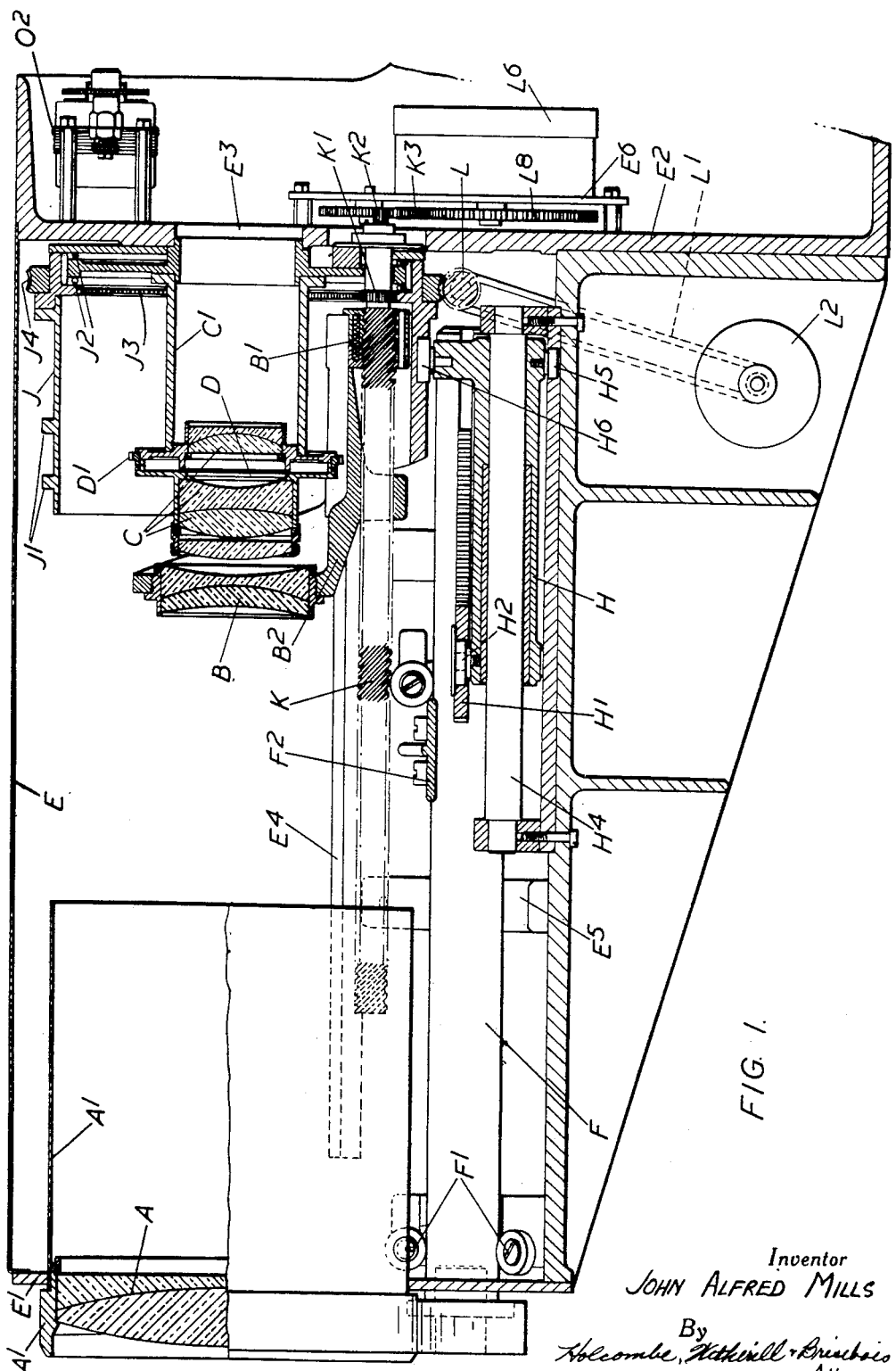

Inventor
JOHN ALFRED MILLS
By
Holcombe, Wetherill + Brisebois
Attorneys

Inventor
JOHN ALFRED MILLS
By
Holcombe, Wetherill & Brisebois
Attorneys

Oct. 18, 1955 J. A. MILLS 2,720,817
CONTROL DEVICES FOR VARIABLE FOCAL LENGTH OPTICAL OBJECTIVES
Filed April 19, 1954 5 Sheets-Sheet 4

Inventor
JOHN ALFRED MILLS
By
Holcombe, Wetherill & Brisebois
Attorneys

Oct. 18, 1955  J. A. MILLS  2,720,817
CONTROL DEVICES FOR VARIABLE FOCAL LENGTH OPTICAL OBJECTIVES
Filed April 19, 1954  5 Sheets-Sheet 5
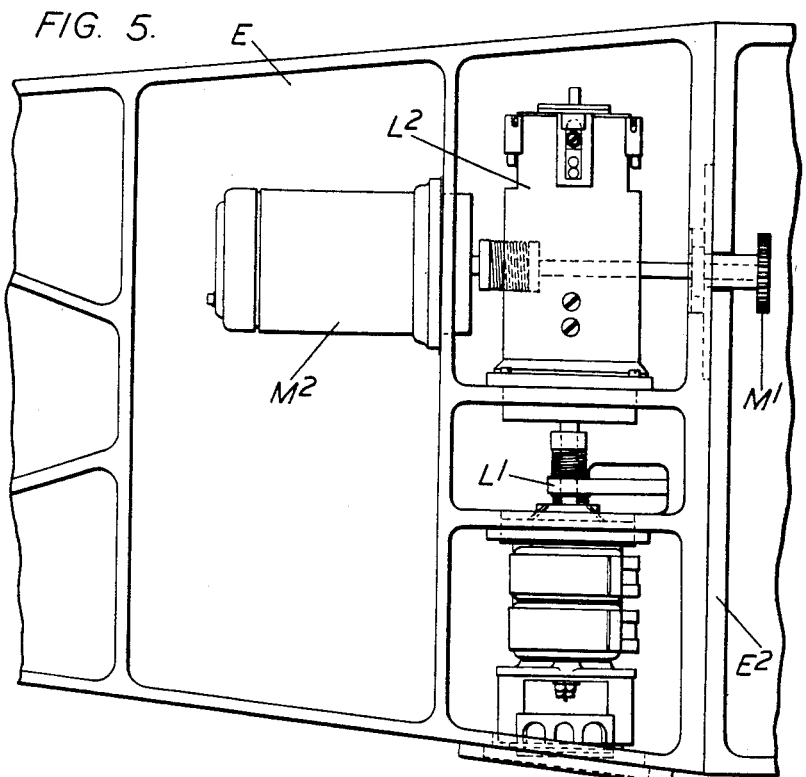
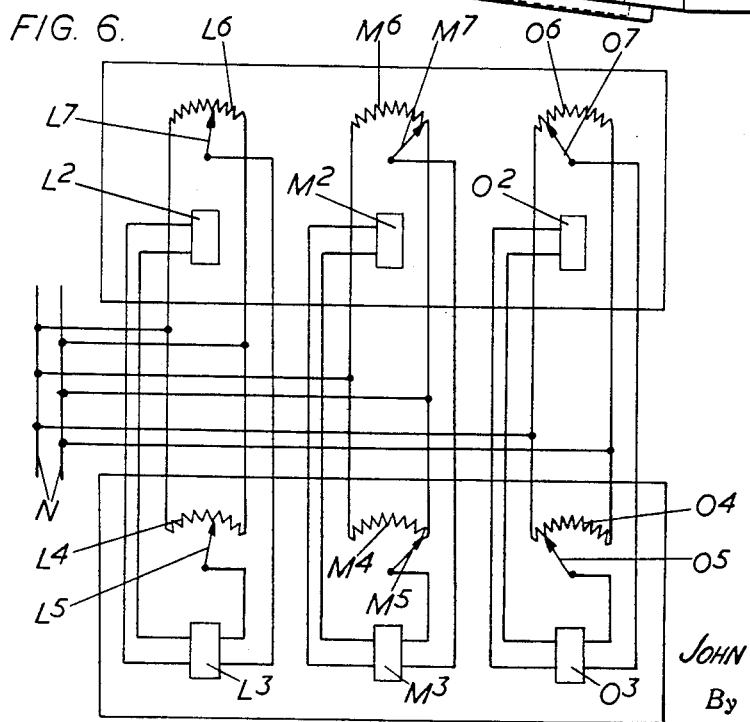
Inventor
JOHN ALFRED MILLS
By
Holcombe Wetherill
Attorneys

United States Patent Office 2,720,817
Patented Oct. 18, 1955

2,720,817

CONTROL DEVICES FOR VARIABLE FOCAL LENGTH OPTICAL OBJECTIVES

John Alfred Mills, Leicester, England, assignor to Taylor, Taylor & Hobson Limited, Leicester, England, a British company Application April 19, 1954, Serial No. 424,175

Claims priority, application Great Britain April 23, 1953

10 Claims. (Cl. 88—57)

This invention relates to a control device for controlling the movements of the relatively movable members of an optical objective of variable equivalent focal length, of the kind in which "zoom" control (for varying the equivalent focal length of the objective without altering the position of the image plane, and thereby varying the size of the image) can be effected by imparting inter-related movements to two members of the objective, and in which different object distances can be accommodated by independent movement imparted to one of such members (hereinafter termed the "focussing member").

The invention is especially useful for controlling the variable focus objective described in the specification of the United States of America Letters Patent No. 2,649,025, granted August 18, 1953, wherein the objective has a stationary convergent rear member, an axially movable divergent middle member and an axially movable convergent front member, the movements of the front two members being so inter-related that the virtual image of an object formed by the divergent combination of such two members has a constant axial position throughout the range of variation of the equivalent focal length of the objective, the front member constituting the focussing member and being capable of movement independent of the middle member for accommodating different object distances without altering the image plane.

The control device according to the present invention, comprises a differential gear whose driven element is connected to the focussing member of the objective, focussing control means for operating one of the two driving elements of the differential gear, zoom control means for simultaneously operating the second driving element of the differential gear and the second movable member of the objective, and a shaped cam forming part of the operative connection between such second driving element and such second movable member for determining the relationship between the movements of the two movable members of the objective.

The differential gear preferably consists of two parallel toothed racks with a pinionn engaging between them, the two racks respectively constituting the driven element and the first driving element of the gear, whilst the pinion is movable in the direction of the length of the racks and constitutes the second driving element of the gear.

The shaped cam may conveniently be formed on a rotary drum surrounding the optical axis of the objective and driven by the zoom control means. The second movable member of the objective may be driven by a quick-pitch screwthread on a shaft geared to the rotary drum, the second driving element of the differential gear being driven by the cam.

The focussing control means and the zoom control means may respectively comprise electric motors operated by remote control from a control point. Thus, each of the electric motors may drive a follower potentiometer in circuit with a control potentiometer at the control point, the arrangement being such that the motor is energised whenever here is a difference between the positions of the two potentiometers and is deenergised when it has driven the follower potentiometer into the position corresponding to that of the control potentiometer. The iris diaphragm of the objective may also be driven by an electric motor similarly operated by remote control from the control point.

Figure 2:
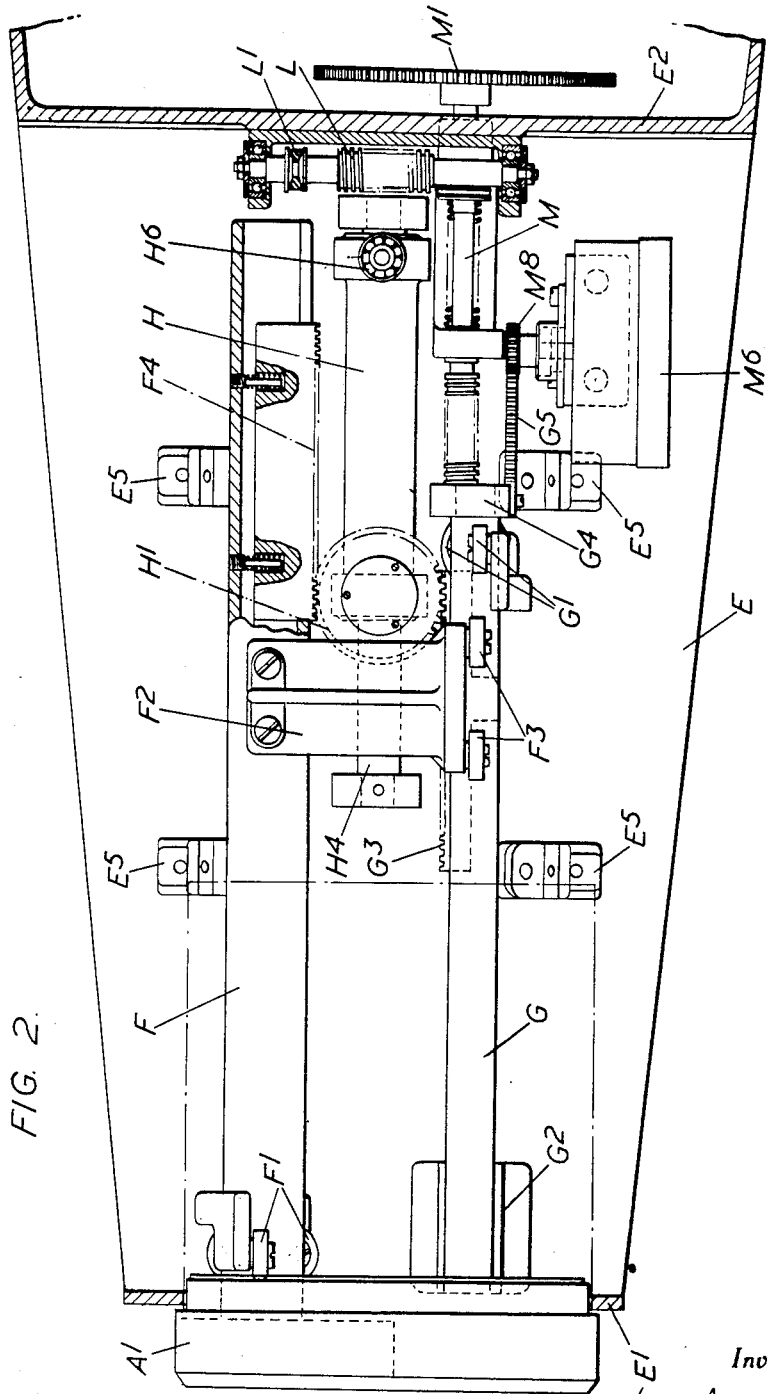
Figure 3:
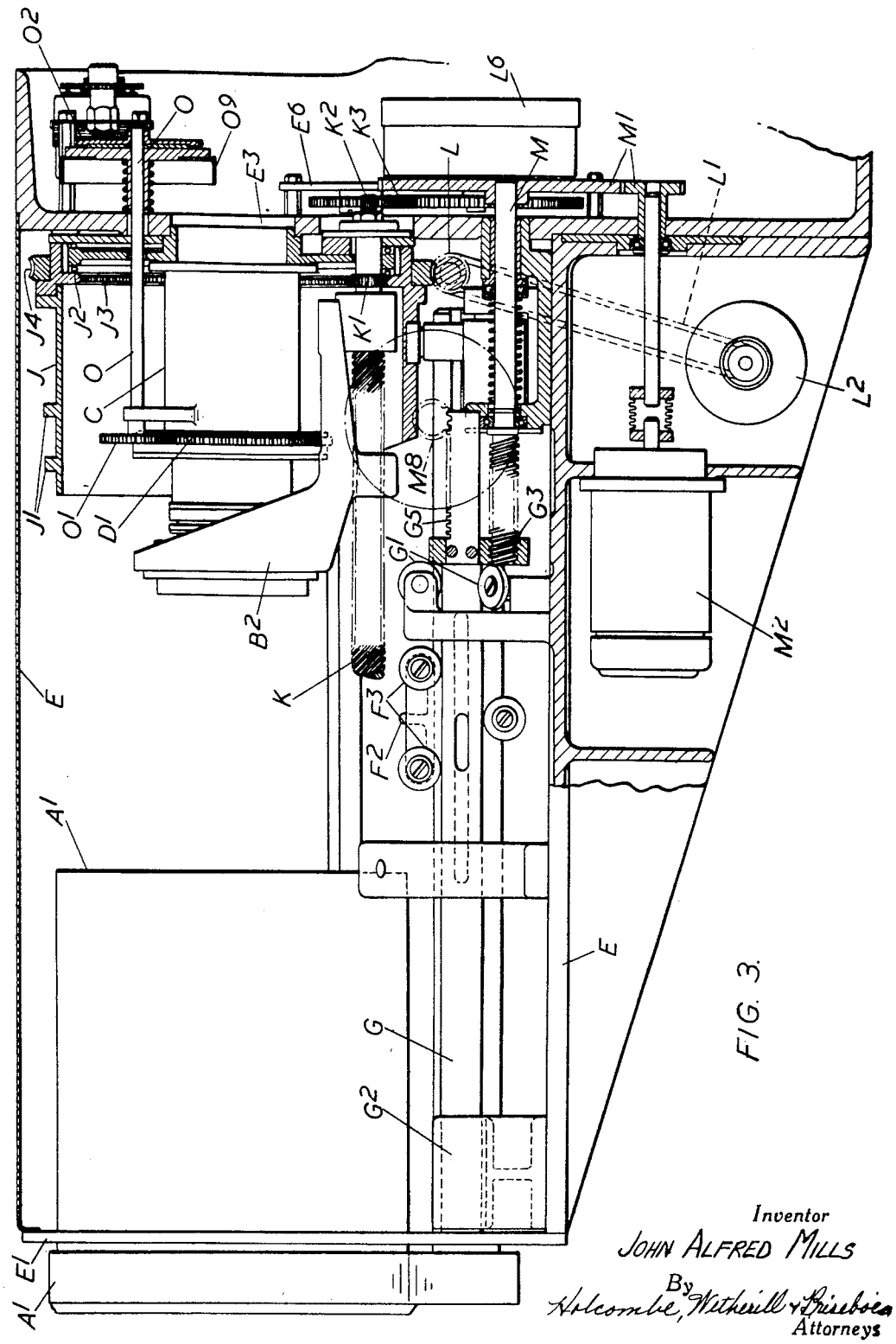
Figure 4:
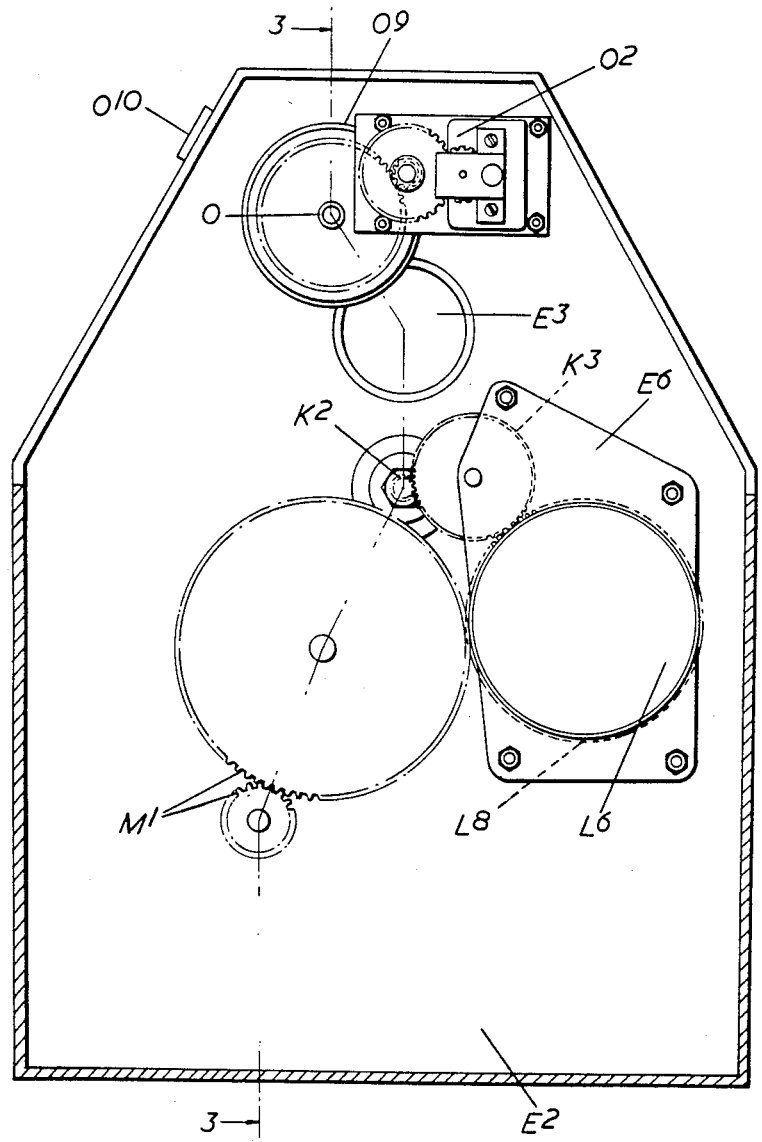

The invention may be carried into practice in various ways, but a preferred practical arrangement according thereto, wherein the control device is applied to the control of a variable focus objective of the kind forming the subject of the above mentioned Letters Patent of the United States of America, is illustrated by way of example in the accompanying drawings, in which Figure 1 is a central vertical sectional view of the preferred arrangement, Figure 2 is a plan view of the lower part of the arrangement beneath the objective, Figure 3 is a vertical sectional view parallel to that of Figure 1 on the line 3—3 of Figure 4, Figure 4 is an end elevation of the arrangement, Figure 5 is an underplan view, and Figure 6 is an electric circuit diagram of the control circuits.

In this arrangement, the objective according to the above mentioned patent consists of three members, of which the front member A is a movable convergent achromatic doublet and the second member B is a movable divergent achromatic doublet, whilst the rear member C is stationary and convergent and consists of a divergent doublet between a convergent simple front component and convergent rear doublet. For any one position of the object, for example at infinity, the variation in the equivalent focal length of the whole objective is brought about by inter-related movements of the front two members A and B, such that the virtual image of the object produced by the divergent combination of such two members has a constant axial position relatively to the stationary rear member C, whereby the final image plane of the objective remains constant, the size of the image varying during the movement. The maximum value of the equivalent focal length of the objective is chosen to be five times the minimum value thereof, the maximum image size similarly being five times the minimum image size. The middle member B of the objective occupies its most forward position when the equivalent focal length of the objective has its minimum value, and the backward movement of the middle member from such position to increase the focal length is given by the expression $f_2(F-1)/\sqrt{5}$, where F is the equivalent focal length of the whole objective (minimum value of which is taken as unity) and $f_2$ is the equivalent focal length of the middle member B, and the corresponding forward movement of the front member A from its initial position is given by the expression $f_2(6-F-5/F)/\sqrt{5}$. It will thus be seen that during the change from the minimum value to the maximum value of the equivalent focal length of the objective, the middle member B moves steadily backwards, whilst the front member A moves forward and then back again to its initial position.

So far, it has been assumed that the object position remains unchanged, and it will be clear that, if the object position changes, a further adjustment will be necessary in order to retain the same resultant image position for all object positions. This is achieved by an additional movement of the front member A independently of the middle and rear members B and C. Taking the position (or rather range of positions) of the front member A corresponding to an infinitely distant object as the standard, the necessary further adjustment of the front member for focussing for a near object consists of a forward movement through a distance equal to $f_1^2/(d-f_1)$, where $f_1$ is the equivalent focal length of the front member A and $d$ is the distance of the object in front of the front nodal point of the front member in its position of adjustment. Since this expression is independent of the equivalent focal length F of the whole objective, it will be clear that for each and any additional adjustment of the front member A to suit a particular object distance, the main inter-related movements of the front two members A and B to vary the focal length and alter the image size can still be effected without alteration of the resultant image position.

In order to retain constant relative aperture throughout the range of movements, the diameters of the front two members A and B, are made greater than is necessary to accommodate the full axial beam for all settings of the iris diaphragm D, which is located within the stationary rear member C so that the diaphragm determines the relative aperture in all positions of adjustment.

The preferred arrangement of the control device according to the present invention, now to be described, is such as to enable the zoom control afforded by the inter-related movements of the front two members A and B and the focussing control afforded by the independent adjustment of the front member A to be effected in a fully satisfactory manner with simple mechanism.

In this arrangement, the front member of the objective is carried in a tubular mounting $A^1$, which can slide through a hole in the front plate $E^1$ of the casing E of the device and is carried by a longitudinally movable shaft F guided at its front end by a set of bearing rollers $F^1$ suitably mounted in the casing E. A second guide for the movable shaft F towards its rear end is afforded by a bracket $F^2$ extending laterally from the shaft and carrying a set of bearing rollers $F^3$ engaging on a second longitudinally moving shaft G parallel to the first, this second shaft being journalled in a set of bearing rollers $G^1$ and resting at its front end in a V-groove $G^2$. The two shafts F and G respectively carry toothed racks $F^4$ and $G^3$ geared together through a pinion $H^1$ between them. This pinion $H^1$ rotates on ball bearings on a pin $H^2$ carried by a hollow rod H which is mounted to slide on balls in a direction parallel to the two shafts F and G on a spindle $H^4$ fixed in the casing E and is held against rotation by a roller $H^5$ engaging in a guide slot in the casing E. At its rear end this hollow rod H carries a cam follower roller $H^6$ which engages in a shaped cam groove $J^1$ formed on the surface of a hollow drum J, which surrounds the stationary rear member C of the objective and is rotatably mounted on a ball bearing ring $J^2$ carried by a tube $C^1$, which is supported in a central hole $E^3$ in the rear plate $E^2$ of the casing E and carries the mount for the stationary rear member C of the objective.

On its inner surface in front of the ball bearing ring $J^2$, the hollow drum J has gear teeth $J^3$ forming an internal gear with which engages a small pinion $K^1$ on a quick-pitch screwthreaded shaft K suitably journalled in the casing E so as to lie parallel to the two longitudinally movable shafts F and G. Engaging with this screwthreaded shaft K is a nut $B^1$ carried by a bracket $B^2$, which supports the mount $B^3$ for the middle member B of the objective and can slide along a V-groove formed by two bars $E^4$ fixed on supporting brackets $E^5$ in the casing E.

Around the outside of the hollow drum J is secured a worm wheel $J^4$, which is driven by a worm L driven through a belt $L^1$ by a reversible electric motor $L^2$ housed beneath the casing E. Another reversible electric motor $M^2$, also housed beneath the casing E, is coupled through gearing $M^1$ to a screwthreaded shaft M, with which engages a nut $G^4$ carried by the second longitudinally movable shaft G.

Thus, when the first of these two motors $L^2$ is energised for effecting zoom control, the hollow drum J is rotated. This causes the internal gear $J^3$ on the drum to drive the quick-pitch screwthreaded shaft K and thereby to move the second member B of the objective. At the same time, the rotation of the drum J acts through the cam groove $J^1$ to drive the hollow rod H carrying the pinion $H^1$ between the two toothed racks $F^4$ and $G^3$. Since the rack $G^3$ on the second longitudinally movable shaft G is held stationary by the nut $G^4$ on the screwthreaded shaft M (except when the second electric motor $M^2$ is operating) the movement of the pinion $H^1$ causes the first longitudinally movable shaft F carrying the front member A of the objective to move at twice the speed of the pinion $H^1$. The shape of the cam groove $J^1$ on the hollow drum J is such as to produce the desired relationship between the movements of the first and second members A and B of the objective to give correct zoom control.

When it is desired to effect focussing control to suit a different object position, the second electric motor $M^2$ is energised to drive the second longitudinally movable shaft G. Since the pinion $H^1$ between the two toothed racks $F^4$ and $G^3$ is held stationary in position by the worm gearing L $J^4$ (except when the first electric motor $L^2$ is operating), this movement of the second longitudinally movable shaft G causes equal and opposite movement of the first longitudinally movable shaft F which carries the front member A of the objective.

The two electric motors $L^2$ and $M^2$ are operated by remote control from a suitable control point. For this purpose, as shown in Figure 6, each motor $L^2$ or $M^2$ is energised through an amplifier $L^3$ or $M^3$ at the control point from a circuit including a control potentiometer $L^4L^5$ or $M^4M^5$ at the control point and a follower potentiometer $L^6L^7$ or $M^6M^7$ driven by the motor $L^2$ or $M^2$. The two potentiometer resistances $L^4$ $L^6$ or $M^4$ $M^6$ are energised in parallel from a suitable source N and the movable contact arms $L^5$ $L^7$ or $M^5$ $M^7$ of the two potentiometers are connected respectively through two leads to the amplifier $L^3$ or $M^3$. The arrangement is such that, when the two contact arms $L^5$ $L^7$ or $M^5$ $M^7$ occupy corresponding positions, there is no potential difference between the two leads connected to the amplifier $L^3$ or $M^3$, so that the electric motor $L^2$ or $M^2$ remains deenergised. When however the control potentiometer contact arm $L^5$ or $M^5$ is moved by hand control to a new position, a potential difference (in one sense or the other depending on the direction in which the contact arm has been moved) is set up between the two leads and after amplification acts to drive the electric motor $L^2$ or $M^2$ in the appropriate direction to effect the desired movement of the objective member or members, the electric motor being automatically deenergised again when the follower potentiometer contact arm $L^7$ or $M^7$ has been moved to the position corresponding to the new position of the control potentiometer arm $L^5$ or $M^5$.

In the case of the focussing control, the contact arm $M^7$ of the follower potentiometer is driven through a pinion $M^8$ engaging with an auxiliary toothed rack $G^5$ carried by the second longitudinally movable shaft G. For the zoom control, the follower potentiometer contact arm $L^7$ is driven through a pinion $L^8$ and idler gear wheel $K^3$ from a pinion $K^2$ on the rear end of the quick-pitch screwthreaded shaft K driving the middle member B of the objective, this potentiometer being mounted on a small plate $E^6$ secured to and spaced from the rear plate $E^2$ of the casing.

It is also convenient to operate the iris diaphragm D of the objective by remote control from the control point. For this purpose, the adjusting ring $D^1$ for the diaphragm on the mount of the stationary rear member C of the objective has external gear teeth engaging with a pinion $O^1$ on a shaft O which passes through the rear plate $E^2$ of the casing. This shaft carries a drum $O^9$ bearing markings to indicate the iris diaphragm setting, so that the setting can be readily inspected through a window $O^{10}$ in the casing, and is also geared to a reversible electric motor $O^2$ operated by remote control from the control point, for example by a potentiometer system $O^3$—$O^7$ (see Figure 6) similar to that used for the other two motors L² and M². The iris diaphragm D is preferably arranged to give a linear law between its settings and the rotation of its driving shaft O to facilitate such remote control.

It will be appreciated that the foregoing arrangement has been described by way of example only and may be modified in various ways within the scope of the invention, for example to suit a variable focus objective other than that forming the subject of the above mentioned patent.

What I claim as my invention and desire to secure by Letters Patent is:

1. A control device for an optical objective of variable equivalent focal length having a stationary rear member and two relatively movable members, of which one constitutes a focussing member to which independent movement can be imparted to accommodate different object distances, whilst zoom control can be effected by imparting inter-related movements to such focussing member and a second movable member of the objective, the said control device comprising a differential gear having a driven element and two driving elements, means for connecting the driven element of the gear to the focussing member of the objective, focussing control means for operating one of the driving elements of the gear, zoom control means for simultaneously operating the second driving element of the gear and the second movable member of the objective, and an operative connection between such second driving element and such second movable member including a shaped cam for determining the relationship between the movements of the two movable members of the objective.

2. A control device as claimed in claim 1, in which the differential gear consists of two parallel toothed racks and a pinion engaging between the racks and movable in the direction of the length thereof, the two racks respectively constituting the driven element and the first driving element and the pinion the second driving element.

3. A control device as claimed in claim 2, in which the operative connection between the pinion of the differential gear and the second movable member of the objective comprises a rotary drum surrounding the optical axis of the objective and driven by the zoom control means such drum carrying the shaped cam, a shaft bearing a quick-pitch screwthread for driving the second movable member of the objective, gearing through which the rotary drum drives such shaft, and means whereby the shaped cam drives the pinion of the differential gear.

4. A control device as claimed in claim 1, in which the operative connection between the second driving element of the differential gear and the second movable member of the objective includes a rotary drum carrying the shaped cam, and means whereby the zoom control means drives the rotary drum.

5. A control device as claimed in claim 4, in which the said operative connection includes a shaft bearing a quick-pitch screwthread for driving the second movable member of the objective, gearing through which the rotary drum drives such shaft, and means whereby the shaped cam drives the second driving element of the differential gear.

6. A control device as claimed in claim 1, in which the focussing control means and the zoom control means respectively comprise two electric motors, and remote control means for operating such motors from a control point.

7. A control device as claimed in claim 6, including control means for operating the iris diaphragm of the objective, such control means comprising a further electric motor, and remote control means for operating such motor from the control point.

8. A control device as claimed in claim 7, in which the remote control means for operating each electric motor comprises a control potentiometer at the control point, a follower potentiometer driven by the electric motor and in circuit with the control potentiometer, and means whereby the motor is energised whenever there is a difference between the operative positions of the two potentiometers and is deenergised when it has driven the follower potentiometer to the operative position corresponding to that of the control potentiometer.

9. A control device as claimed in claim 6, in which the remote control means for operating each electric motor comprises a control potentiometer at the control point, a follower potentiometer driven by the electric motor and in circuit with the control potentiometer, and means whereby the motor is energised whenever there is a difference between the operative positions of the two potentiometers and is deenergised when it has driven the follower potentiometer to the operative position corresponding to that of the control potentiometer.

10. A control device as claimed in claim 6, in which the differential gear consists of two parallel toothed racks and a pinion engaging between the racks and movable in the direction of the length thereof, the two racks respectively constituting the driven element and the first driving element of the gear and the pinion the second driving element thereof, and the operative connection between such pinion and the second movable member of the objective comprises a rotary drum carrying the shaped cam and driven by the zoom control motor, a shaft bearing a quick-pitch screwthread for driving the second movable member of the objective, gearing through which the rotary drum drives such shaft, and means whereby the shaped cam drives the pinion of the differential gear.

References Cited in the file of this patent

UNITED STATES PATENTS

| | | |
|---|---|---|
| 1,947,669 | Warmisham et al. | Feb. 20, 1934 |
| 2,159,394 | Mellor et al. | May 23, 1939 |
| 2,165,341 | Capstaff et al. | July 11, 1939 |
| 2,353,565 | Kaprellian | July 11, 1944 |
| 2,432,685 | Walker | Dec. 5, 1950 |
| 2,649,025 | Cook | Aug. 18, 1953 |
| 2,663,223 | Hopkins | Dec. 22, 1953 |